E. B. LAKE.
Window-Screens.
No. 152,656. Patented June 30, 1874.
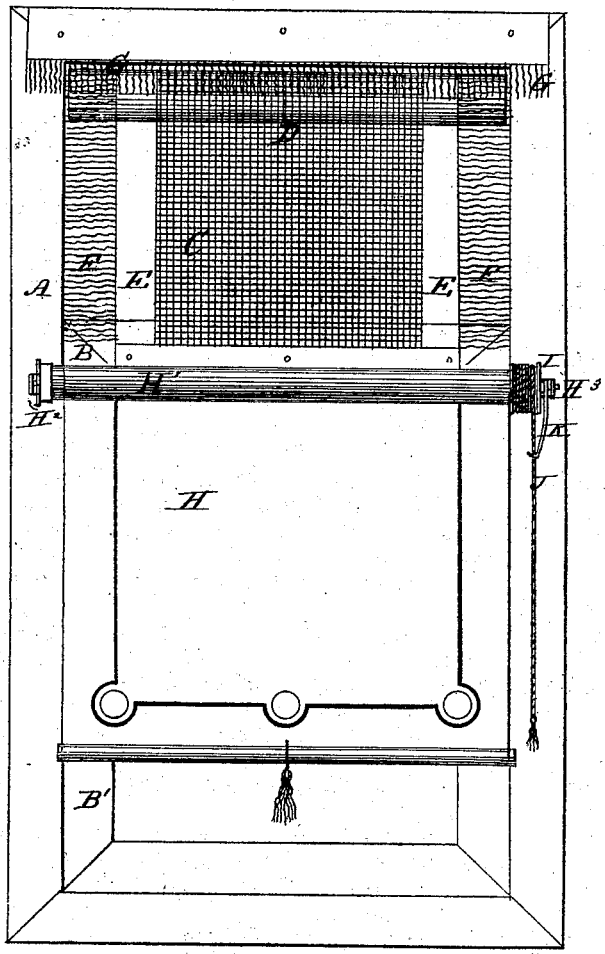
WITNESSES
INVENTOR
Ezra B. Lake
By Connolly Bro'
Attorneys.

UNITED STATES PATENT OFFICE.

EZRA B. LAKE, OF TOM'S RIVER, NEW JERSEY.

IMPROVEMENT IN WINDOW-SCREENS.

Specification forming part of Letters Patent No. 152,656, dated June 30, 1874; application filed January 9, 1874.

*To all whom it may concern:*

Be it known that I, EZRA B. LAKE, of Tom's River, in the county of Ocean and State of New Jersey, have invented certain new and useful Improvements in Mosquito-Nets for Windows; and I do hereby declare the following to be a full, clear, and exact description of the invention, such as will enable others skilled in the art to which it pertains to make and use it, reference being had to the accompanying drawings, which form part of this specification, in which the figure is a face view of a window-frame having my improvement applied.

This invention has relation to insect-guards for windows; and consists in the provision of auxiliary fringed guards to prevent the entrance of insects at the sides and top of the principal guard; also, in the combination, with the insect-guard, guard-roller, and sliding sash, of brackets to support the curtain-roller attached directly upon the sliding sash.

Referring to the accompanying drawings, A designates the window-frame; B B', the upper and lower sliding sashes, respectively; C, the insect-guard or mosquito-netting attached to the transverse roller D, located at the top of the window-frame, and to the top bar of the upper sash. The roller D is made partly tubular, and contains a spiral spring. When the sash is raised the guard is rolled by the automatic action of the roller. E designates flexible stays of any suitable material, the object of which is to relieve the netting of strain, and thereby prevent its injury. F designates auxiliary fringe-guards arranged at the sides of the netting, and preferably attached thereto or to the stays, and designed to prevent the entrance of insects at the sides of the window when the main guard is moved by the wind or otherwise displaced, or when the netting cannot be conveniently extended so as to completely fill the space above the sash. The fringe-guards are wound upon the roller in the same manner as the netting. G designates an auxiliary fringe-guard attached to the top of the window-frame and touching the roller D, said guard being to prevent the entrance of insects through the space above the roller. The fringe-guards may be made from any material adapted to the purpose to which they are applied, as raveled hair-cloth, for instance. H designates the window-curtain; $H^1$, the curtain-roller, and $H^2$ $H^3$ the supporting-brackets secured to the upper bar of the upper sliding sash, thence projecting inwardly and bent laterally, so as to support a long roller beyond the surface of the window-frame.

The insect-guard will serve its purpose if attached to the lower sash, and the roller placed at the bottom of the frame.

Having fully described my invention, what I claim, and desire to secure by Letters Patent, is—

1. The auxiliary fringe-guards, as and for the purpose described.

2. The combination, with the insect-guard attached to the sliding sash, of the curtain-brackets, also attached to said sash, substantially as specified.

In testimony that I claim the foregoing I have hereunto set my hand this 26th day of December, 1873.

EZRA B. LAKE.

Witnesses:
 CHARLES S. DAY,
 ALFEARD SMITH.